US005818413A

United States Patent [19]

Hayashi et al.

[11] Patent Number: 5,818,413

[45] Date of Patent: Oct. 6, 1998

[54] DISPLAY APPARATUS

[75] Inventors: Yuji Hayashi; Hiroaki Ichikawa; Masayuki Iida; Hiroyoshi Tsubota, all of Kanagawa, Japan

[73] Assignee: Sony Corporation, Japan

[21] Appl. No.: 607,135

[22] Filed: Feb. 26, 1996

[30] Foreign Application Priority Data

Feb. 28, 1995 [JP] Japan .................................... 7-065189

[51] Int. Cl.[6] ................................ G09G 3/36; H04N 3/14

[52] U.S. Cl. ............................................ 345/100; 348/792

[58] Field of Search ............................... 345/98, 100, 99, 345/103, 127, 132, 3; 348/792, 793

[56] References Cited

U.S. PATENT DOCUMENTS

| | | | |
|---|---|---|---|
| 4,275,421 | 6/1981 | Louie et al. | 345/98 |
| 4,701,799 | 10/1987 | Yoshimura | 348/793 |
| 4,908,710 | 3/1990 | Wakai et al. | 348/793 |
| 5,097,257 | 3/1992 | Clough et al. | 345/132 |
| 5,168,270 | 12/1992 | Masumori et al. | 345/100 |
| 5,381,182 | 1/1995 | Miller et al. | 348/792 |
| 5,412,397 | 5/1995 | Kanatani et al. | 345/99 |
| 5,448,259 | 9/1995 | Hidaka | 345/98 |
| 5,506,602 | 4/1996 | Yokoyama | 345/132 |
| 5,568,163 | 10/1996 | Okumura | 345/100 |
| 5,644,332 | 7/1997 | Matsuzaki et al. | 345/100 |

FOREIGN PATENT DOCUMENTS

| | | |
|---|---|---|
| 0 416 550 A3 | 3/1991 | European Pat. Off. . |
| 0 607 778 A1 | 7/1994 | European Pat. Off. . |

OTHER PUBLICATIONS

EPO Search Report.

*Primary Examiner*—Jeffery Brier
*Assistant Examiner*—Paul A. Bell
*Attorney, Agent, or Firm*—Ronald P. Kananen

[57] ABSTRACT

A display apparatus comprises arrayed pixels, a vertical-scanning circuit, and a horizontal-scanning circuit. The vertical-scanning circuit outputs selection pulses one after another to sequentially scan pixels in one vertical-scanning period in units of lines. The horizontal-scanning circuit sends and writes a video signal into the pixel line selected by the sequential scanning in one horizontal-scanning period. The vertical-scanning circuit is provided with a switching section to control the consecutive outputs of the selection pulses and to adjust the number of pixel lines to be selected in one horizontal period according to the specification of the video signal used. This configuration enables both noninterlaced drive and interlaced drive.

10 Claims, 15 Drawing Sheets

DISPLAY APPARATUS

BACKGROUND OF THE INVENTION

1. Field of the Invention

The present invention relates to display apparatuses among which typical is an active-matrix liquid crystal panel having a horizontal-scanning circuit and a vertical-scanning circuit, and more particularly, to a display apparatus which has a full-line screen and can internally switch between an interlaced drive and a noninterlaced drive.

2. Description of the Related Art

In the NSTC method, which is the Japanese TV broadcasting standard, one frame consists of two fields, odd and even fields, and has 525 lines and a frame frequency of 30 Hz. Most compact liquid crystal TV sets and projection liquid crystal displays now available have, however, 220 to 240 horizontal-scanning lines. The number of these lines is about half that of the effective scanning lines in the NSTC method. These liquid crystal displays use a half-line drive, which completes one screen only with a video signal for one field. Although the vertical resolution decreases in terms of picture quality, the half-line drive increases the resolution by about 30% compared with interlaced scanning with the same number of lines because the half-line drive uses noninterlaced scanning. With this consideration being taken into account, the vertical resolution decreases by about 35% in the half-line drive.

This reduction in resolution affects a little to the quality of a picture on a small screen, such as a 3- or 4-inch screen. For a projection liquid crystal display which projects a picture onto a large screen, such as a 40-inch or more screen, a full-line drive is strongly required and it has been increasingly developed these days. FIG. 16 shows an active-matrix liquid crystal panel with a full frame. This panel comprises a screen 101 including arrayed liquid crystal pixels, a vertical-scanning circuit (V scanner) 102, and a horizontal-scanning circuit (H scanner) 103. The V scanner 102 outputs selection pulses one after another to sequentially scan pixels in one vertical-scanning period in units of lines. The H scanner 103 writes a video signal into the pixel line 104 selected by the sequential scanning in one horizontal-scanning period. As described above, an active-matrix liquid crystal panel with a full frame has twice the number of lines 104 (horizontal-scanning lines) in comparison with a panel with a half frame, which has 220 to 240 lines. Such a liquid crystal panel with a full frame is especially suited to a projection liquid crystal display or the like for displaying computer graphics on a large screen. In this case, since a video signal such as that called VGA is supplied, a noninterlaced drive is possible without any modification.

In some cases, instead of a noninterlaced signal such as VGA, an interlaced signal such as a TV signal is required to be input for displaying TV images or video images. In this case, the interlaced signal such as a TV signal is doubled in speed in a converter 105, and then supplied to a liquid crystal display, as shown in FIG. 17. With this processing, a TV signal can be used in a noninterlaced drive in the same way as for a VGA signal. To perform double-speed processing in the converter 105, however, a large capacity of memory is required, making the system large. To summarize, when one liquid crystal panel is used in common for a computer-output signal, such as a VGA signal, and a usual TV signal, a large capacity of external memory is required to apply a noninterlaced drive to the TV signal, making the system complicated.

To display a TV signal on a liquid crystal panel with a full frame, an interlaced drive can be used instead of using noninterlace conversion. FIG. 18 shows such an example. In this case, the V scanner 102 selects two lines at a time in one horizontal-scanning period. In this two-line simultaneous selection method, however, when pairs of lines selected at the same time are fixed, only the same resolution as that in a half-frame structure is obtained.

FIG. 19 shows an example with an improved structure. A pair of V scanners 102*a* and 102*b* are provided at the left and right sides of the screen 101. The first V scanner 102*a* is, for example, for the odd field. It selects the first and second lines at the same time, and next selects the third and fourth lines simultaneously. In contrast, the second V scanner 102*b* is for the even field. It selects the first line alone, and then selects the second and third lines at the same time. Next, it selects the fourth and fifth lines simultaneously. In this way, pairs of lines selected at the same time are changed in the odd and even fields, increasing the vertical resolution. Although the pair of V scanners, 102*a* and 102*b*, can handle an interlaced drive for a TV signal, however, they are not required for a noninterlaced drive for an input VGA signal. This means that this structure is not necessarily suited to a full-frame structure which can be used in common for a noninterlaced drive and an interlaced drive.

FIG. 20 shows another circuit structure which enables an interlaced drive to be performed in a liquid crystal panel with a full frame structure. This circuit has two systems of scanners, the first V scanner 102*c* for odd-numbered lines and the second V scanner 102*d* for even-numbered lines. When this pair of V scanners, 102*c* and 102*d*, are built in the liquid crystal panel, the panel has to be larger in size by the space required for those scanners. A structure having two systems of scanners is not necessarily required for a noninterlaced drive, having no particular merits. The method shown in FIG. 20, in which every other lines are selected in each field, is the same as an interlaced drive in a CRT. Since a liquid crystal panel needs ac drive, however, refresh is performed at 15 Hz in effect and it may cause flickers. In a half frame structure having about 230 lines in the vertical direction, refresh is made at 30 Hz, causing no flicker problem. To display a picture in the same quality as that for a TV display with 400 lines or more, the above-described flickers have to be eliminated.

SUMMARY OF THE INVENTION

To solve the above-described technical problems in the conventional apparatuses, it is an object of the present invention to provide, in a display apparatus with a full-frame structure designed for displaying computer outputs such as a VGA signal, a circuit enabling a TV signal to be also displayed. In other words, it is an object of the present invention to provide a display apparatus which allows both interlaced drive shown in FIG. 16 and noninterlaced drive shown in FIG. 19 or FIG. 20 simply by internal switching operations. To achieve the foregoing object, the following measures are taken. A display apparatus according to the present invention basically comprises arrayed pixels, a vertical-scanning circuit, and a horizontal-scanning circuit. The vertical-scanning circuit sequentially outputs selection pulses and line-sequentially scans pixels in one vertical-scanning period. The horizontal-scanning circuit transmits and writes a video signal in one horizontal-scanning period into the pixel lines selected with the sequential scanning. It is a feature of the apparatus that the vertical-scanning circuit includes switching means for controlling the switching of the selection pulses sequentially output and adjusts the number of pixel lines to be selected in a horizontal-scanning period according to the standard of the video signal. The following describes operations precisely. The switching means enables a noninterlaced drive to be performed for one frame in one vertical-scanning period by selecting one line in every horizontal-scanning period when a video signal conforming to the noninterlace standard is input. The switching means enables an interlaced drive to be performed for one field in one vertical-scanning period by selecting two lines at the same time in every horizontal-scanning period when a video signal conforming to the interlace standard is input, and shifts the simultaneously selected two lines by one line in every field.

The foregoing configuration can also be applied when video signals conforming to various standards having the different numbers of scanning lines are handled. The switching means enables a normal drive by always selecting one line in every horizontal-scanning period when a video signal conforming to the normal standard having the regular number of scanning lines is input. The switching means also enables an so-called extension drive by combining at the specified rate a drive with one line being selected in one horizontal-scanning period and a drive with two lines being selected in one horizontal-scanning period when a video signal conforming to a special standard having a less number of scanning lines than the regular number is input.

The vertical-scanning circuit comprises a multiple-stage shift register for sequentially transmitting a vertical-scanning start signal according to a vertical-scanning clock signal and for sequentially generating primary selection pulses, and gate means for generating secondary selection pulses by applying gate processing to a pair of primary selection pulses output from adjacent stages in the shift register. The switching means is disposed between the shift register and the gate means, and supplies the pair of primary selection pulses to the gate means as is to output secondary selection pulses when one line is selected in one horizontal-scanning period. The switching means also supplies one of the pair of primary selection pulses to the gate means with the other being intercepted to allow the original primary selection pulse to be output when two lines are selected at the same time in one horizontal-scanning period.

The vertical-scanning circuit allows an interlaced drive with every other lines being selected to be performed, instead of an interlaced drive with two lines selected at the same time. The vertical-scanning circuit enables an interlaced drive to be performed for one field in one vertical-scanning period by selecting one of two pixel lines and not selecting the other in every horizontal-scanning period when a video signal conforming to the interlace standard is input, and includes means for switching pixel lines to be selected and pixel lines to be not selected in every field.

According to the present invention, the vertical-scanning circuit embedded in the display apparatus can internally switch between one-line separate selection and two-line simultaneous selection. With this configuration, both noninterlaced drive and interlaced drive can be used in one display apparatus. By combining one-line separate selection and two-line simultaneous selection appropriately, video signals conforming to various standards can be displayed.

DETAILED DESCRIPTION OF THE PREFERRED EMBODIMENT

Figure 1A:
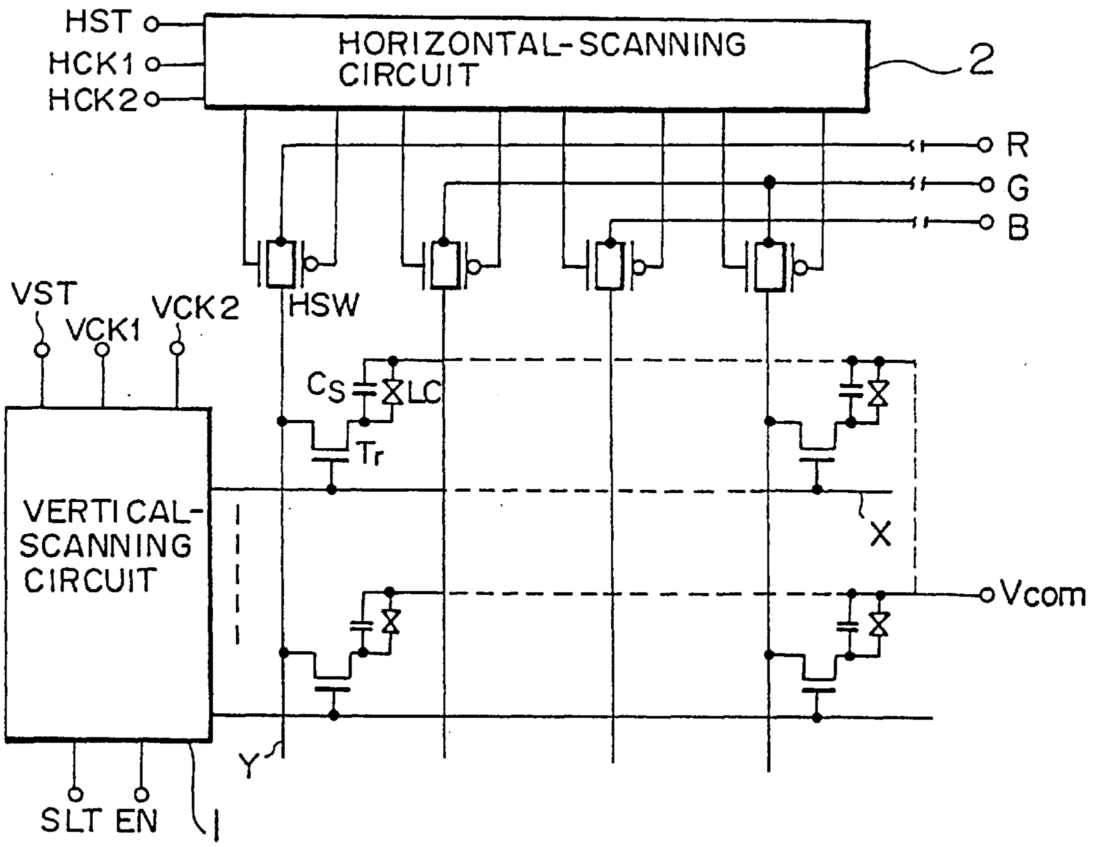
FIGS. 1A and 1B are circuit diagrams of a display apparatus according to a first embodiment of the present invention.
Figure 1B:
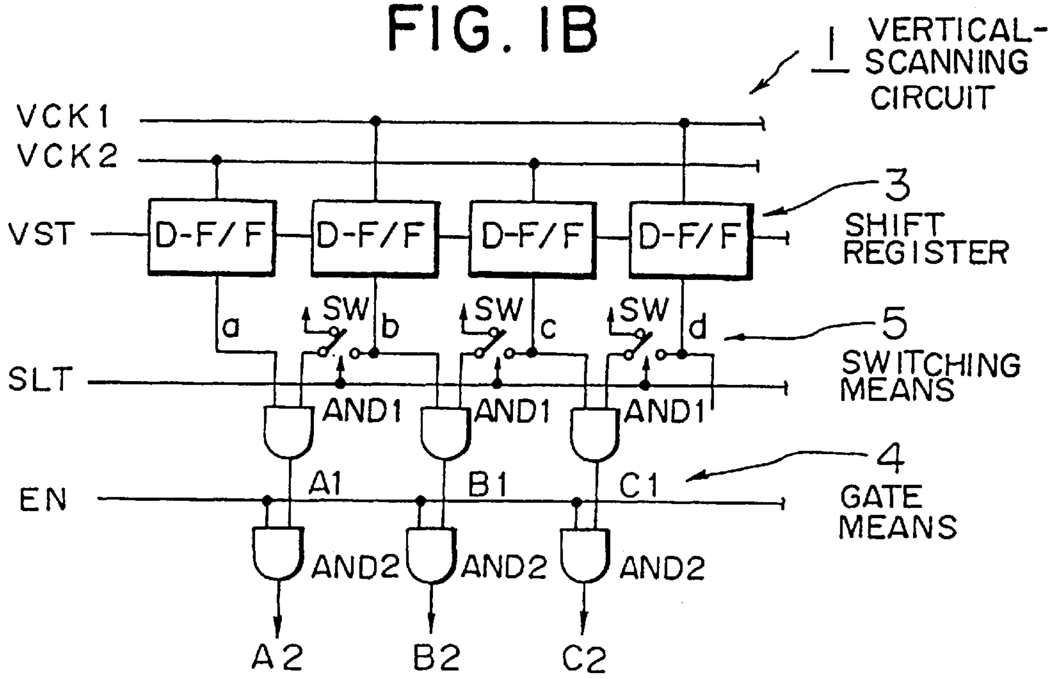

A preferred embodiment of the present invention will be described below in detail by referring to the drawings. FIGS. 1A and 1B are circuit diagrams showing a basic configuration of an active-matrix liquid crystal panel used in a display apparatus according to the present invention. FIG. 1A illustrates the entire configuration of the liquid crystal panel, which includes peripheral circuits. As shown in the figure, the panel has arrayed pixels LC. Each liquid crystal pixel LC comprises liquid crystal held between the pixel electrode provided at an active-element substrate and the opposing electrode provided at an opposing substrate. The specified opposing voltage $V_{com}$ is applied to the opposing electrode. Each liquid crystal pixel LC is connected to a supplementary capacitor $C_s$ in parallel. As a switching element for driving each liquid crystal pixel LC, a thin-film transistor $T_r$ is integrated. Gate lines X are arranged along the row direction of the arrayed liquid crystal pixels LC and signal lines Y are arranged along the column direction, perpendicular to the gate lines X. The source electrode of each thin-film transistor $T_r$ is connected to the corresponding signal line Y, the drain electrode is connected to the corresponding pixel electrode, and the gate electrode is connected to the corresponding gate line X.

The liquid crystal panel further comprises a vertical-scanning circuit (V scanner) 1 and a horizontal-scanning circuit (H scanner) 2. The vertical-scanning circuit 1 outputs selection pulses one after another to the gate lines X to make the thin-film transistors $T_r$ on the same gate line electrically conductive and line-sequentially scans the liquid crystal pixels LC. The vertical-scanning circuit 1 sequentially transmits a rectangular vertical-scanning-start signal VST input from the outside in synchronization with rectangular vertical-scanning clock signals VCK1 and VCK2 also input from the outside to output the above-described selection pulses. VCK1 and VCK2 shift by 180 degrees from each other in phase. In addition to these signals, control signals, SLT and EN, are also supplied.

The horizontal-scanning circuit 2 controls opening and closing of the horizontal analog switch HSW connected to each signal line Y. Through this horizontal analog switch HSW, video signals for the three primary colors, red (R), green (G), and blue (B), are supplied to each signal line Y. The horizontal-scanning circuit 2 sequentially transmits a horizontal-scanning-start signal HST input from the outside in synchronization with horizontal-scanning clock signals HCK1 and HCK2 also input from the outside to control opening and closing of horizontal analog switches HSW. With this configuration, video signals are sent to and written into liquid crystal pixels LC on a line selected for one horizontal-scanning period. HCK1 and HCK2 shift by 180 degrees from each other in phase.

The vertical-scanning circuit 1 has switching means for controlling the switching of the sequential output of selection pulses to adjust the number of lines to be selected in a horizontal-scanning period according to the specification of video signals. FIG. 1B shows a detailed configuration of the circuit. As shown in the figure, the vertical-scanning circuit 1 includes a shift register 3 comprising multiple stages of D flip-flops to sequentially transmit the vertical-scanning start signal VST to sequentially generate primary selection pulses a, b, c, d, etc. The vertical-scanning circuit 1 also includes gate means 4 to apply a gate operation to a pair of primary selection pulses (for example, a and b) output from two stages adjacent to each other in the shift register 3 to generate the secondary selection pulse (for example, A1). The gate means 4 comprises front-stage AND gate elements (AND1) arranged correspondingly to the stages of the shift register 3. In this embodiment, back-stage AND gate elements (AND2) are provided to shape the waveforms of secondary selection pulses A1, B1, C1, etc. Enable signal EN is applied to one input terminal of each of AND2 and one of secondary selection pulses A1, B1, C1, etc. which have not yet been waveform-shaped is input to the other input terminal of AND2. The secondary selection pulses which have been waveform-shaped, A2, B2, C2, etc., are output from the output terminals of AND2. Switching means 5 is disposed between the shift register 3 and the gate means 4. The switching means 5 comprises switches SW disposed correspondingly to the stages of D flip-flops. Opening and closing of the switches SW are controlled by externally-input control signal SLT. When a line is selected in one horizontal-scanning period, control signal SLT becomes low to close the switches. Then, a pair of first selection pulses (for example, a and b) is applied to the gate means 4 as is and the corresponding secondary selection pulse (for example, A2) is output. When two lines are selected at the same time in one horizontal-scanning period, control signal SLT becomes high to open the switches so that the power voltage is connected. Then, one of a pair of first selection pulses (for example, b) is disconnected and the other (for example, a) is applied to the gate 4 to allow the original first selection pulse (a in this case) to be output. This first selection pulse a is waveform-shaped in the specified way at the back-stage AND gate element AND2 in the gate means 4.

Figure 2:
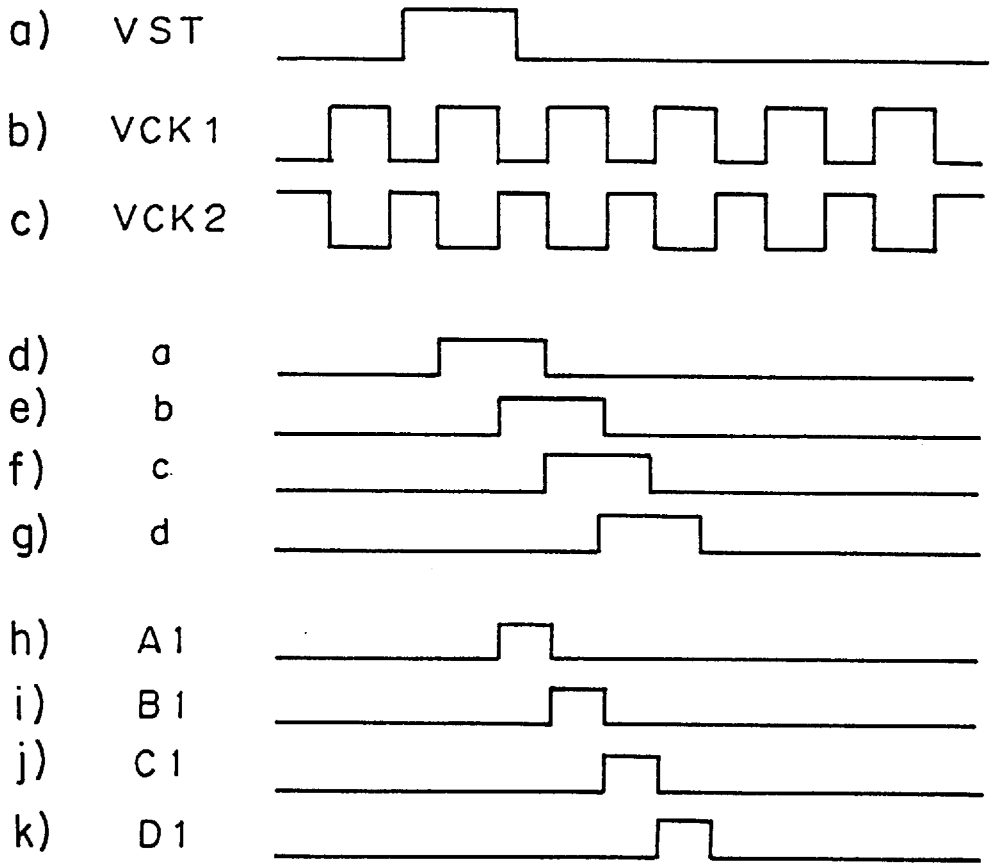
FIG. 2 is a timing chart used for explaining operations in the first embodiment.

By referring to FIGS. 2 and 3, operations of the vertical-scanning circuit shown in FIG. 1B will be described in detail. FIG. 2 is a timing chart of signals used in a liquid crystal panel having a full-frame structure in a noninterlaced drive. This timing chart is applied, for example, when a computer output such as a VGA signal is displayed. Vertical-scanning clock signals VCK1 and VCK2 have a duty cycle of 50%. In a noninterlaced drive, control signal SLT is low and the switches in the switching means 5 are electrically conductive. Enable signal EN for waveform shaping is an active-low signal and fixed to high in a noninterlaced drive. Signals a to d shown in the timing chart in FIG. 2 correspond to the primary selection pulses output from the stages of the D flip-flops shown in FIG. 1B. As understood from the figure, vertical-scanning start signal VST is sequentially transmitted at each half period of clock signals VCK1 and VCK2, and primary selection pulses a to d are obtained sequentially from the D flip-flop stages. These primary selection pulses are handled by AND1 and secondary selection pulses A1, B1, C1, D1, etc. are sequentially output. Since enable signal EN is fixed to high, these secondary selection pulses A1 to D1 are output as is as final secondary pulses A2 to D2. Therefore, in a noninterlaced drive, the primary selection pulses A2, B2, C2, etc. are sequentially generated at each line of the liquid crystal panel and a video signal for one line is transmitted and written.

Figure 3:
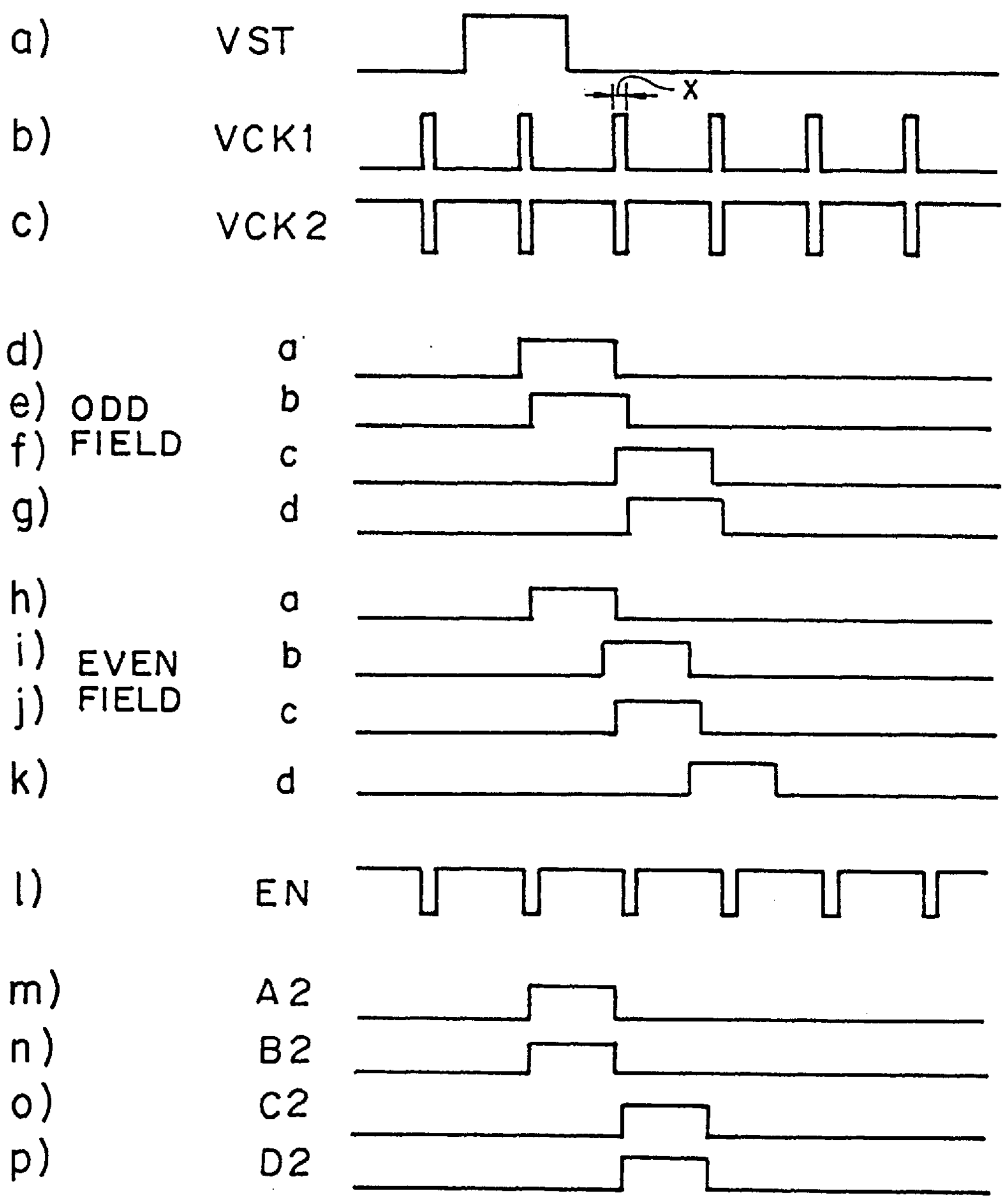
FIG. 3 is a timing chart used for explaining operations in the first embodiment.

FIG. 3 is a timing chart of signals in an interlaced drive with two lines being selected at the same time. This timing is applied, for example, when a TV signal is displayed on the liquid crystal panel shown in FIG. 1A. In this interlaced drive, control signal SLT is switched to high, and switches SW in the switching means 5 become open. The primary selection pulses output from the D flip-flop stages are supplied to and passes through the corresponding front-stage AND-gate elements AND1 in the gate means 4. Enable signal EN comprises active-low pulses. As shown in the figure, when an interlaced drive with two lines being selected at the same time is applied to the liquid crystal panel having a full-frame structure according to the present invention, the duty cycle of VCK1 is set to 5% and that of VCK2 is set to 95%. In this case, primary selection pulse b output from the second-stage D flip-flop is delayed by the time corresponding to the duty cycle of 5% against primary selection pulse a output from the first-stage D flip-flop. Primary selection pulse c output from the third-stage D flip-flop is delayed by the time corresponding to the duty cycle of 95% against primary selection pulse b output from the second-stage D flip-flop. A pair of primary selection pulses a and b is substantially overlapped and can select two lines at the same time in one horizontal-scanning period. The next pair of primary selection pulses c and d is also substantially overlapped and can select two lines at the same time. Switches SW in the switching means 5 are set to open so that the primary selection pulses a to d pass through the front-stage AND-gate element AND1 in the gate means 4 as is. At the rising or falling edges, however, primary selection pulses a to d are overlapped with each other by time X corresponding to a duty cycle of 5%. To eliminate this overlap, enable signal EN is periodically made low to close back-stage AND-gate element AND2 in the gate means by the time corresponding to the overlap. This time is set within the horizontal-scanning blanking period and it is set sufficiently short so that it does not cause any practical problems. As a result, from the gate means 4, a pair of secondary selection pulses A2 and B2 which are completely overlapped is output and two lines can be selected at the same time. In the next horizontal-scanning period, a pair of secondary selection pulses C2 and D2 are output with the two pulses being completely overlapped and two lines are selected at the same time. A pair of A2 and B2 is completely separated from a pair of C2 and D2 by the above-described waveform shaping with enable signal EN. To perform an interlaced drive with two lines being selected at the same time, pairs of two lines selected at the same time have to be shifted by one line in the odd field and the even field. In this embodiment, VCK1 and VCK2 are switched in every field to change pairs of two lines selected at the same time. As shown in the timing chart in FIG. 3, pairs of a and b, and c and d in the odd field are shifted by one line in the even field by switching VCK1 and VCK2.

As described above, selection pulses used for line-sequential scanning are generated by the shift register 3 having D flip-flops, shown in FIG. 1B. In this embodiment, to reduce the number of transmission stages, the front-stage AND-gate elements AND1 included in the gate means 4 are used for logical processing to generate secondary selection pulses which are not overlapped each other. This operation is performed with the timing shown in the timing chart in FIG. 2 for a noninterlaced drive. In contrast, the shift register is driven with vertical-scanning clock signals VCK1 and VCK2 to output pulses for selecting two lines at the same time in an interlaced drive, as shown in the timing chart shown in FIG. 3. With this configuration, pulses for selecting two lines at the same time can be output. If AND1 operates as in noninterlaced scanning, however, necessary selection pulses cannot be output. Therefore, to implement a vertical-scanning circuit which can be used for both noninterlaced drive which selects one line separately, and interlaced drive which selects two lines at the same time, the switching means 5, shown in FIG. 1B, are added to select the use or non-use of AND1 in each scanning. In a noninterlaced drive, the vertical-scanning clock signals shown in FIG. 2 drive the shift register and switch the wiring such that a pair of primary selection pulses passes through the same AND1. In an interlaced drive with two lines being selected at the same time, the wiring is switched such that primary selection pulses output from the shift register 3 separately pass through AND1.

Figure 4:
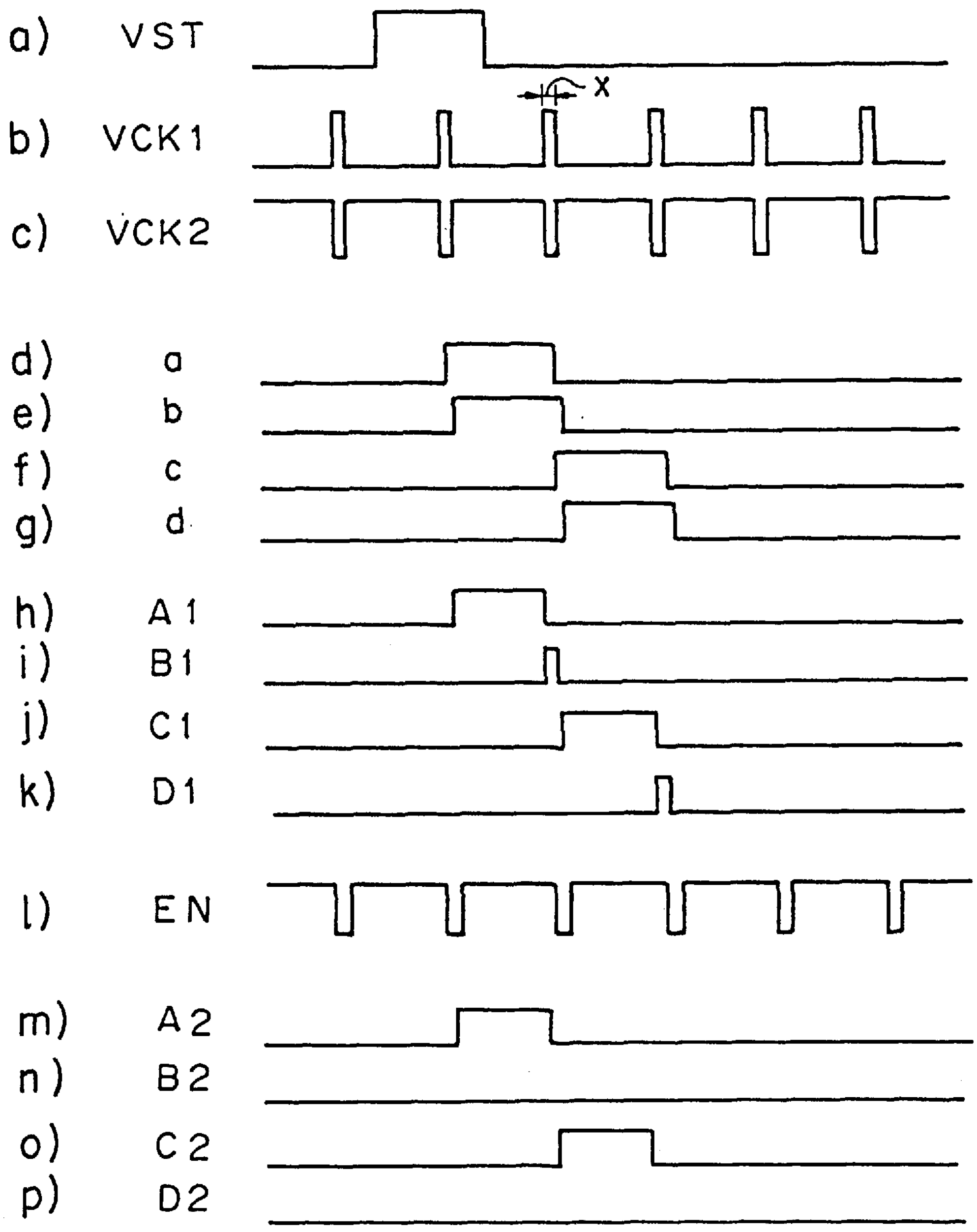
FIG. 4 is a timing chart used for explaining operations in the first embodiment.

FIG. 4 is a timing chart of signals used for an interlaced drive in a liquid crystal panel having a full-frame structure with every other line being selected. Unlike an interlaced drive with two lines being selected at the same time, described above, this interlaced drive uses the switching means 5 in its electrically conductive state in the same way as for a noninterlaced drive. In other words, control signal SLT is held in the low level. This interlaced drive, with every other line being selected, is the same as that used for a CRT. If a flicker at a frequency of 15 Hz can be suppressed to a level at which no problem occurs by improvements such as that in resistivity of the liquid crystal and that in the current leakage of a switching thin-film transistor Tr, this interlaced drive can also be practical. As shown in the figure, to implement an interlaced drive with every other line being selected, the duty cycle of VCK1 is set to 5% and that of VCK2 is set to 95% in this embodiment. These settings are the same as for an interlaced drive with two lines being selected at the same time. Primary selection pulse b output from the second-stage D flip-flop is delayed by the time corresponding to the duty cycle of 5% against primary selection pulse a output from the first-stage D flip-flop. Primary selection pulse c output from the third-stage D flip-flop is delayed by the time corresponding to the duty cycle of 95% against primary selection pulse b output from the second-stage D flip-flop. These primary selection pulses, a, b, c, d, etc., are handled in the front-stage AND-gate elements AND1, and secondary selection pulses, A1, B1, C1, D1, etc., are output from the stages. Namely, wide, valid selection pulses A1 and C1 and narrow, invalid selection pulses B1 and D1 are alternately output every other line. When VCK1 is set in advance such that its pulse time X falls in the horizontal-scanning blanking period, the invalid selection pulses, B1 and D1, are output within the horizontal-scanning blanking period. Therefore, any effective video signals are not written for even-numbered lines.

In the present invention, the active-low enable signal, EN, is supplied to the back-stage AND-gate element AND2 included in the gate means 4 in practice in the above-described interlaced drive. Enable signal EN is synchronized with the horizontal-scanning blanking period, disabling the output of invalid selection signals B1 and D1. Therefore, only the valid secondary selection pulses A2, C2, etc. are sequentially supplied to odd-numbered lines and no selection pulses are supplied to even-numbered lines as shown in the bottom of the timing chart in FIG. 4.

Figure 5:
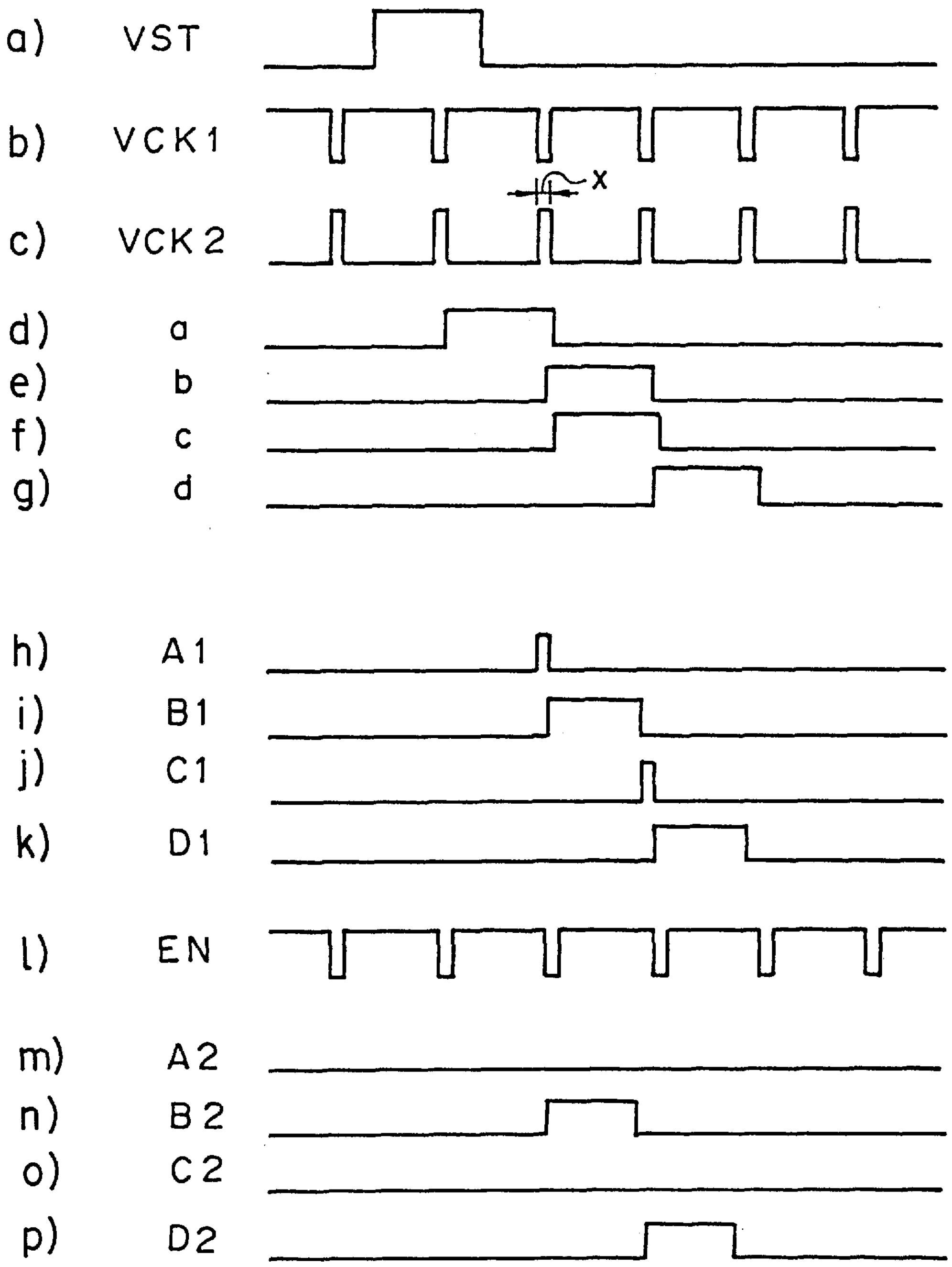
FIG. 5 is a timing chart used for explaining operations in the first embodiment.

The timing chart shown in FIG. 5 differs from that shown in FIG. 4 in that VCK1 and VCK2 are switched. Therefore, in FIG. 5, the phase relationship between primary selection pulses a, b, c, d, etc. shift by one line. Only valid selection pulses B2, D2, etc. are output to select even-numbered lines, and odd-numbered lines are not selected in the end. As described above, valid selection pulses for every other line are supplied, for example, to odd-numbered lines in the odd field and to even-numbered lines in the even field, implementing an interlaced drive. With clock signals VCK1 and VCK2 shown in FIG. 2 and those shown in FIGS. 4 and 5 being switched by an external timing generator, an interlaced drive and a noninterlaced drive are possible in the same active-matrix liquid crystal panel.

Figure 6:
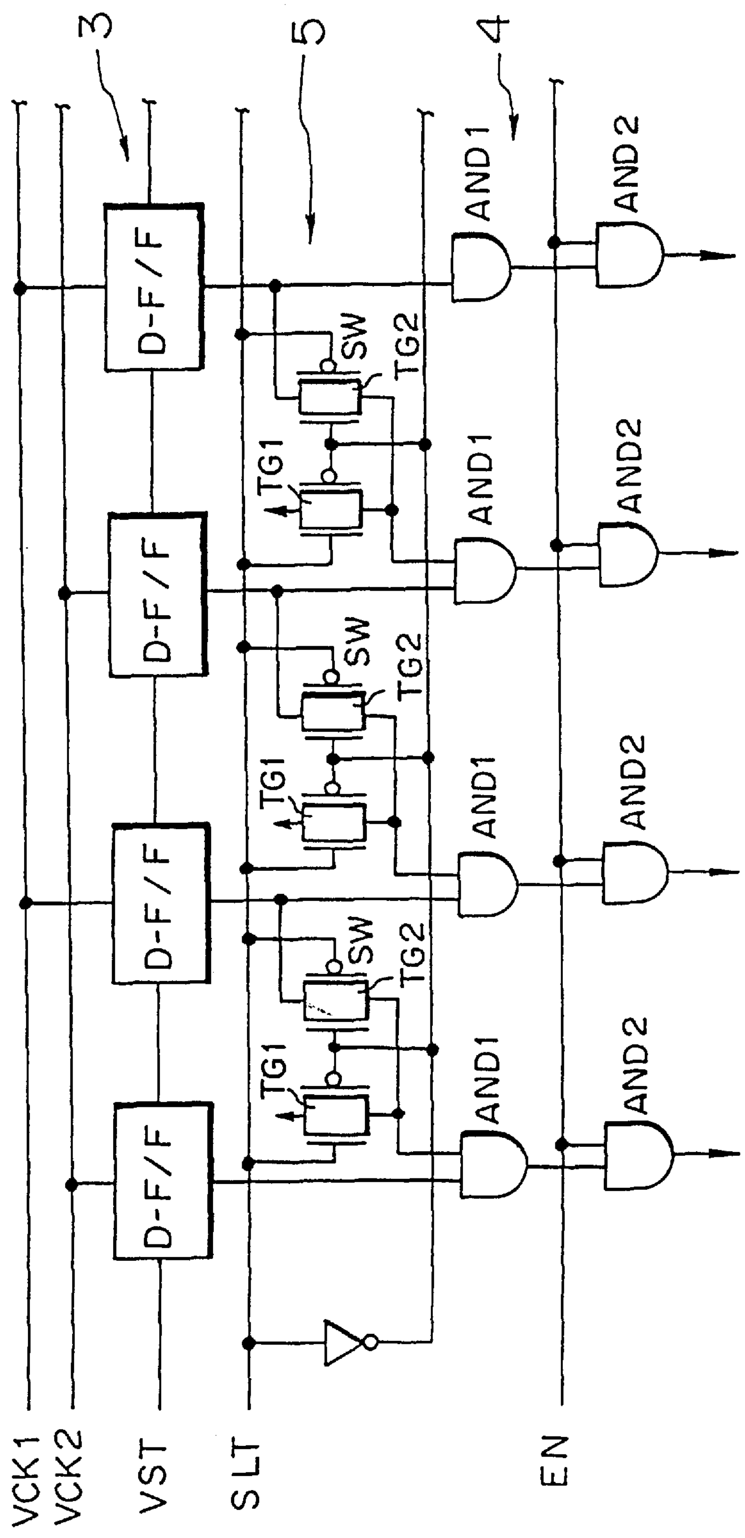
FIG. 6 is a circuit diagram showing a detailed configuration of a vertical-scanning circuit embedded in the first embodiment.

FIG. 6 is a circuit diagram showing a detailed configuration of switches SW included in the switching means 5 shown in FIG. 1B. In this example, each selection switch SW comprises a pair of transmission gate elements. When control signal SLT is low, one transmission gate element, TG1, becomes electrically non-conductive, and the other transmission gate element, TG2, becomes conductive. Therefore, a primary selection pulse output from the next-stage D flip-flop is supplied to the same AND1 together with the previous-stage primary selection pulse. When control signal SLT switches to high, TG1 becomes conductive while TG2 becomes non-conductive. The next-stage D flip-flop is separated. Since a high-level power voltage is supplied from TG1 to AND1 instead, AND1 opens its gate. Primary selection pulses output from the D flip-flop stage pass through AND1 as is.

Figure 7:
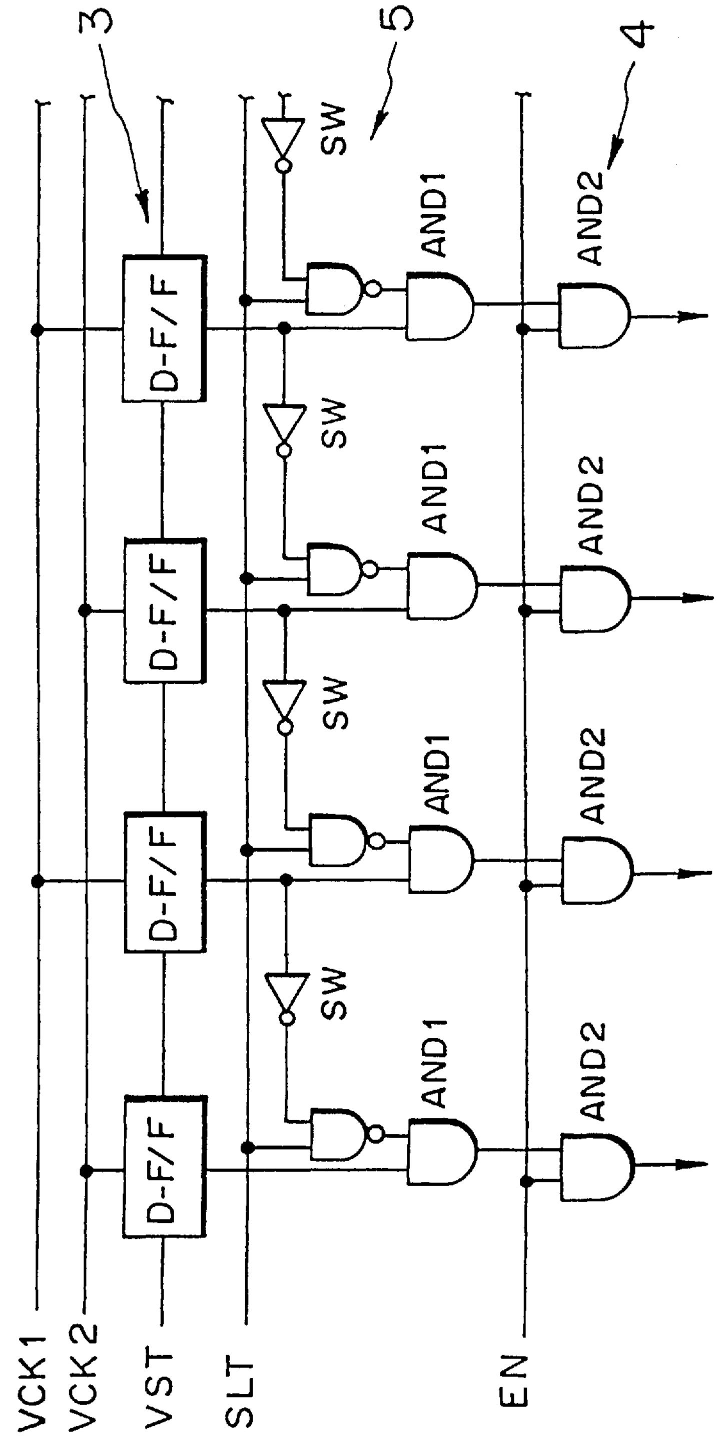
FIG. 7 is a circuit diagram showing a detailed configuration of another vertical-scanning circuit embedded in the first embodiment.

FIG. 7 is a circuit diagram showing another detailed configuration of switches SW included in the switching means 5 shown in FIG. 1B. In this example, each selection switch SW comprises a combination of one NAND-gate element and one inverter. When control signal SLT is low, since a NAND-gate element opens its gate, the primary selection pulse output from the next-stage D flip-flop is supplied to AND1 through the inverter element and the NAND-gate element. In contrast, when SLT becomes high, the NAND-gate element closes its gate, fixing its output to high. Therefore, the primary selection pulse output from the next-stage D flip-flop is separated from AND1 corresponding to the previous stage.

A liquid crystal panel which can internally switch between one-line separate selection and two-line simultaneous selection can be used in both noninterlaced drive and interlaced drive. It can be also used for video signals having various specifications with the different numbers of scanning lines. With two lines selected at the same time at the desired horizontal position, an input video signal having a less number of scanning lines than the standard can be appropriately displayed without using a scan converter or the like by eliminating variations in the aspect ratio caused by the signal, with "extension" scanning. A computer output such as VGA can be displayed on a liquid crystal panel without changing the aspect ratio in modes having the different number of scanning lines. An example for such a case will be described below.

Figure 8A:
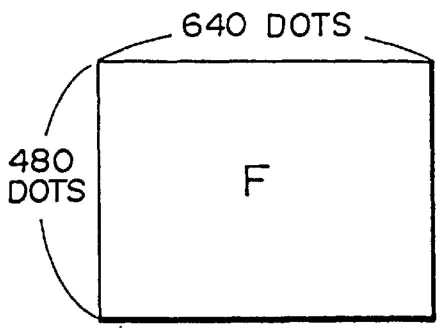
FIGS. 8A and 8B are typical plans showing dot configurations of liquid crystal panels.
Figure 8B:
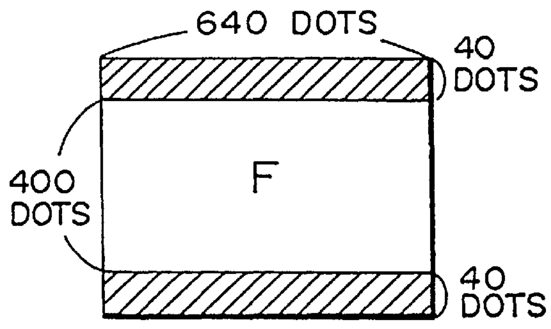

Computer output signals such as VGA have many modes. Some modes have the different numbers of scanning lines. Signals in those modes can be displayed on a CRT with the vertical display period being changed. In devices such as a liquid crystal panel in which the number of pixels (the number of dots) is fixed, however, if changes are made to display signals having the different numbers of scanning lines, the aspect ratio changes accordingly. A VGA signal in the standard mode, for example, has 640 dots in the horizontal direction and 480 dots in the vertical direction as shown in FIG. 8A. A VGA signal in a variation mode has 640 by 400 dots as shown in FIG. 8B, which has the least number of scanning lines. If this signal is displayed on a liquid crystal panel having 640 by 480 dots, sections corresponding to 40 vertical dots at the top and bottom are formed where no signal is displayed, changing the aspect ratio of an image. In order to eliminate this problem, a video signal has to be stored once in external memory or the like and input to the liquid crystal panel with an appropriate interpolation signal being inserted into the video signal, requiring a scan-converter system, making the configuration complicated, and increasing the cost.

Figure 9:
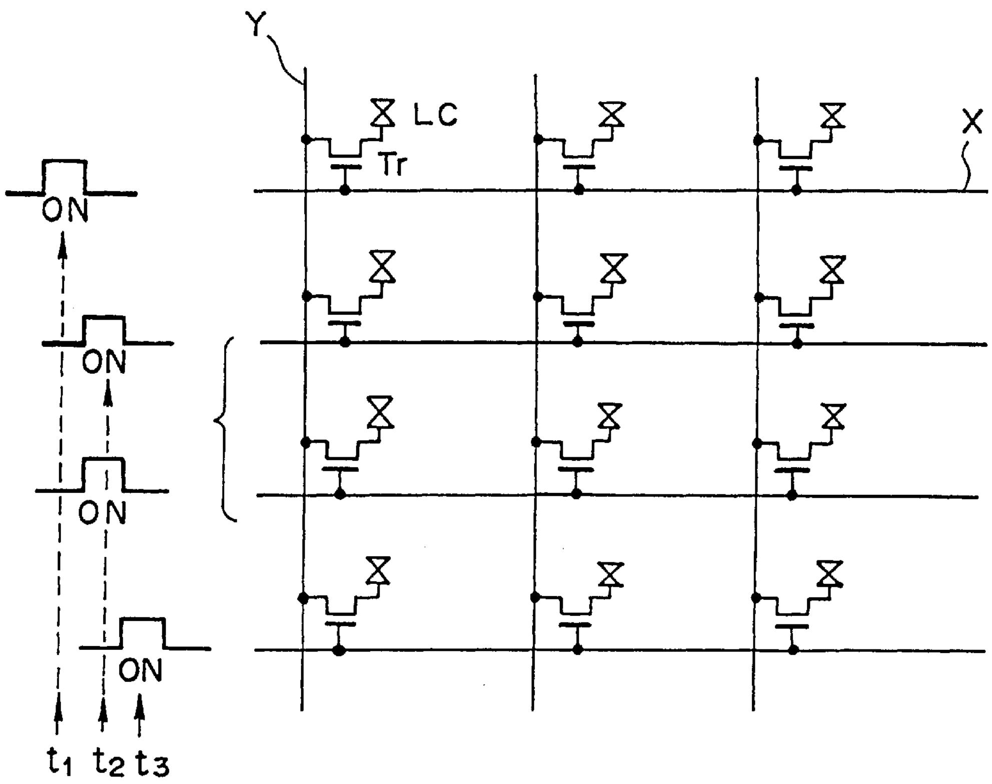
FIG. 9 is a circuit diagram used for explaining an “extension” drive in a liquid crystal panel.

To solve the problem without making the system complicated, two gate lines X are selected at the same time and the same video signal is input to the corresponding liquid crystal cells LC as shown in FIG. 9. With this operation, an image extending in the vertical direction as a whole can be displayed.

Figure 10:
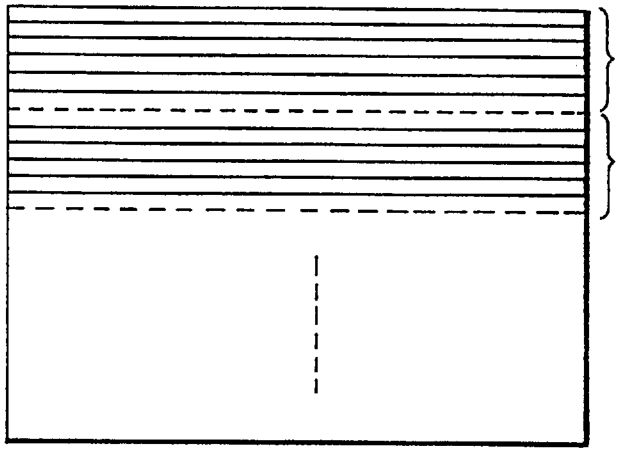
FIG. 10 is a typical plan showing an “extension” drive.

When a video signal having 640 by 400 dots is input to a liquid crystal panel having 640 by 480 dots, an image can be displayed with the same aspect ratio by selecting two lines at the same time for one line per six lines as shown in FIG. 10.

Figure 11:
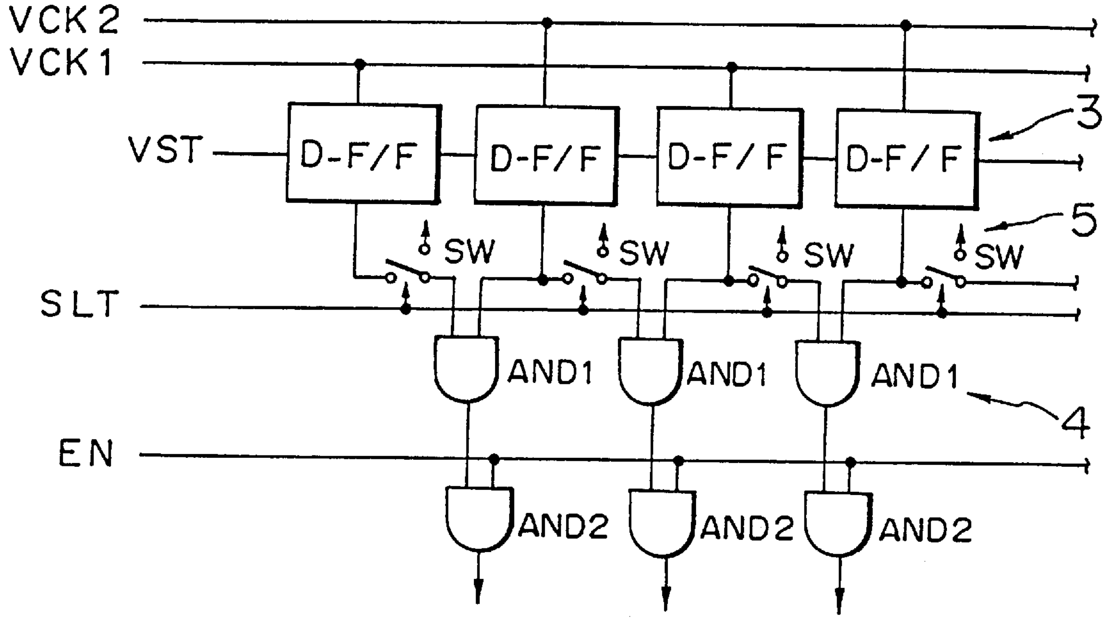
FIG. 11 is a block diagram showing the configuration of a vertical-scanning circuit suitable for an “extension” drive.

To implement such an "extension" drive, a vertical-scanning circuit for intermittently selecting two lines at the same time is required. FIG. 11 shows an example of such a circuit. This circuit is basically the same as that shown in FIG. 1B and the same reference numerals as those used in FIG. 1B indicate the corresponding portions. Namely, the switching means 5 is disposed between the shift register 3, comprising multiple stages of D flip-flops, and the gate means 4. Control signal SLT controls the opening and closing of the switching means 5. When a video signal conforming to the usual standard, having the regular number of scanning lines, is input, the switching means 5 selects one line in one horizontal-scanning period to allow a normal drive. When a video signal conforming to a special standard having a less number of scanning lines than the regular number, is input, the switching means 5 combines one-line selection and simultaneous two-line selection in one horizontal-scanning period at the specified rate to enable an "extension" drive.

Figure 12:
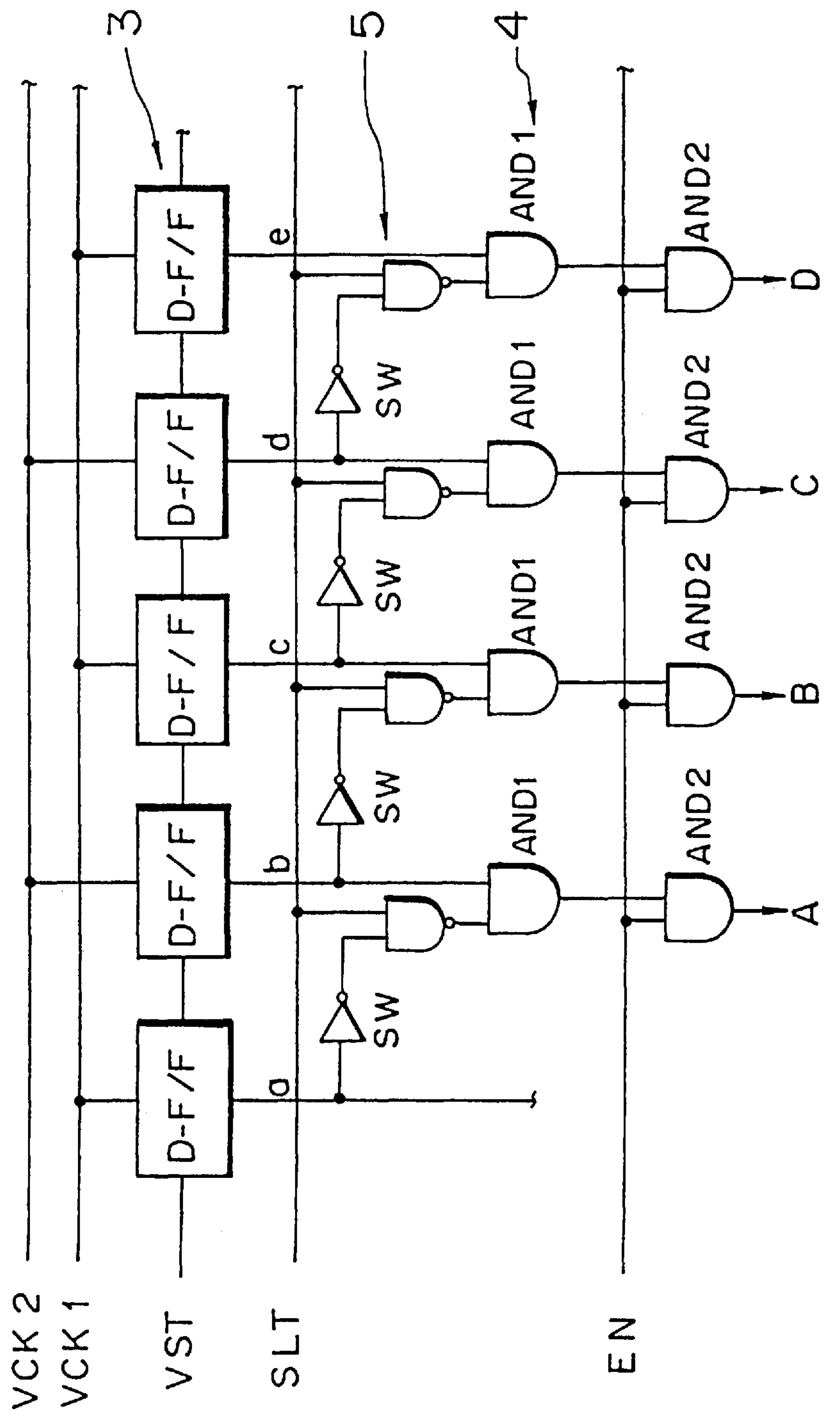
FIG. 12 is a circuit diagram showing a detailed configuration of the vertical-scanning circuit shown in FIG. 11.
Figure 13:
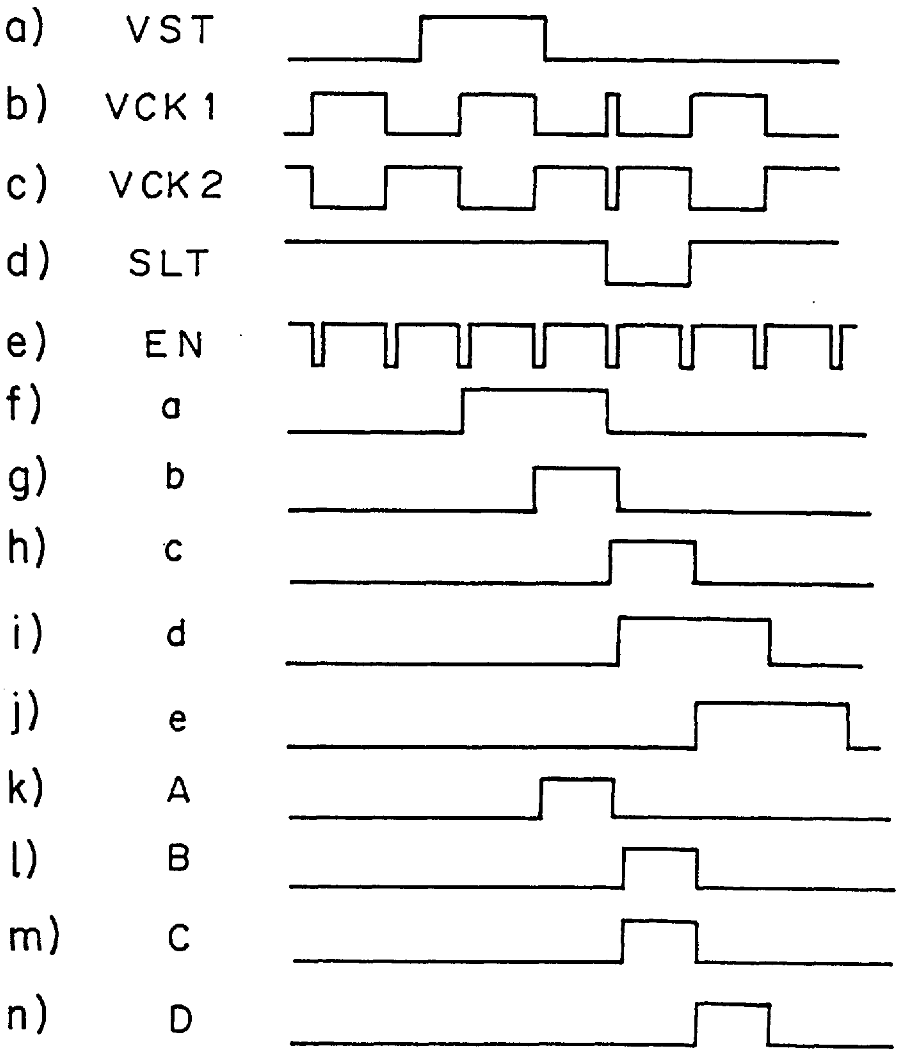
FIG. 13 is a timing chart used for explaining operations of the vertical-scanning circuit shown in FIG. 12.

FIG. 12 shows a detailed configuration of the switching means 5 shown in FIG. 11. Basically, the circuit is the same as that shown in FIG. 7. The switching means 5 comprises multiple stages of switches SW, each including a combination of a NAND-gate element and an inverter element. Vertical-scanning clock signals VCK1 and VCK2, which are in phase with a phase difference of 180 degrees, are supplied to D flip-flops alternately. Vertical-scanning start signal VST is input to the first stage of a D flip-flop. Primary selection pulses a, b, c, d, and e, output from the corresponding stages of D flip-flops, pass through the switching means 5 and the gate means 4, and secondary selection pulses A, B, C, and D are output. "Extension" scanning operation in the vertical-scanning circuit shown in FIG. 12 will be described below by referring to the timing chart shown in FIG. 13. As shown in the figure, VCK1 and VCK2 having a duty cycle of 50% are supplied when sequential line selection is performed. Control signal SLT is held at the high level. With these operations, secondary selection pulses corresponding to one-line selection (for example, A and D) are output. When simultaneous two-line selection is performed, the duty cycles of VCK1 and VCK2 are switched to 5% and 95%. Control signal SLT is also changed to the low level at the same time. With these operations, secondary selection pulses B and C are output at the same time only in this horizontal-scanning period. As described above, one-line separate selection and two-line simultaneous selection can be switched at the desired time, implementing an "extension" drive, simply by switching the phases of VCK1 and VCK2, supplied from the timing generator, and the level of control signal SLT.

Figure 14:
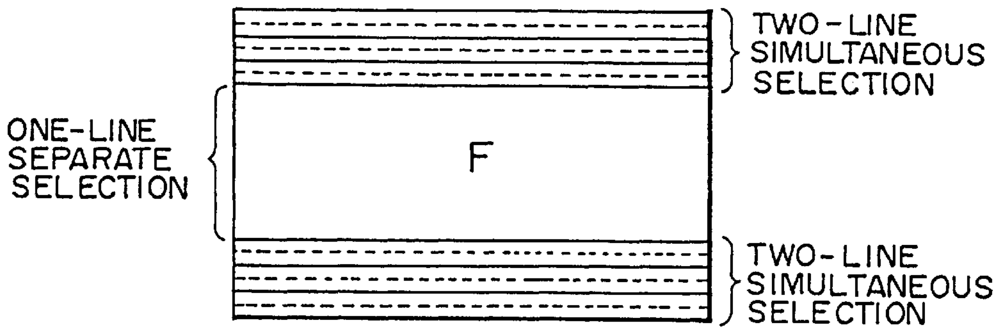
FIG. 14 is a typical plan showing another example of an “extension” drive.

When a video signal having 400 dots in the vertical direction is input to a screen having 480 dots in the vertical direction, with simultaneous two-line selection performed for one line per six lines, the aspect ratio does not change as described above. An image, however, is displayed with extension as a whole. To prevent this extension from occurring, for example, each line is selected separately at the center part of a screen and two lines are simultaneously selected at the top and bottom of the screen, as shown in FIG. 14. Then, the important portion of an image, which is likely to be displayed at the center, is prevented from extending vertically.

Figure 15:
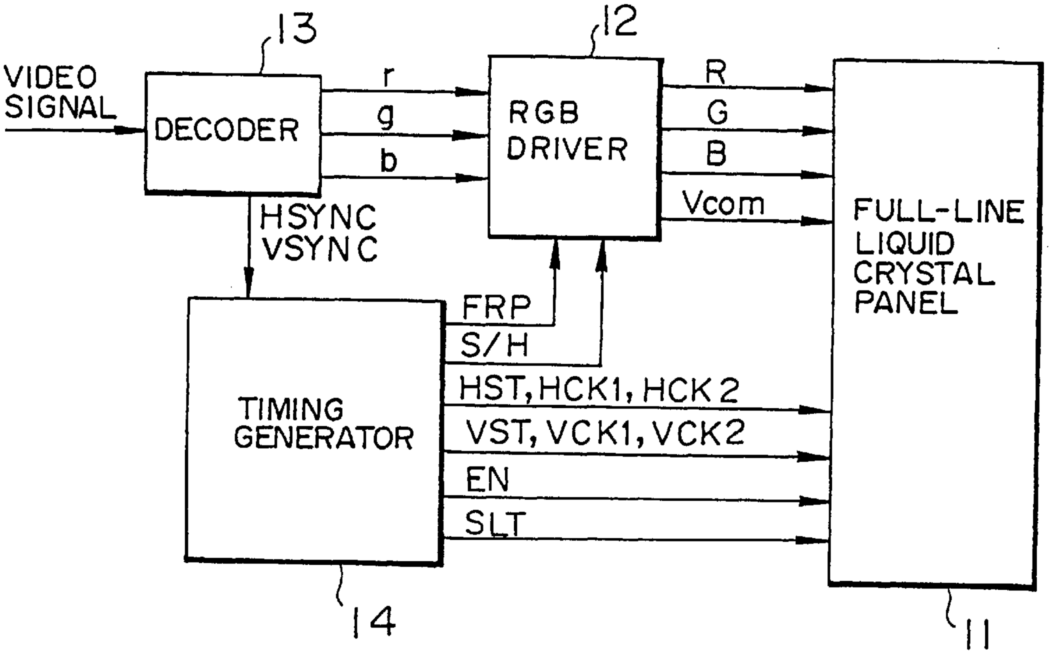
FIG. 15 is a system block diagram showing the entire configuration of a display apparatus according to the present invention.
Figure 16:
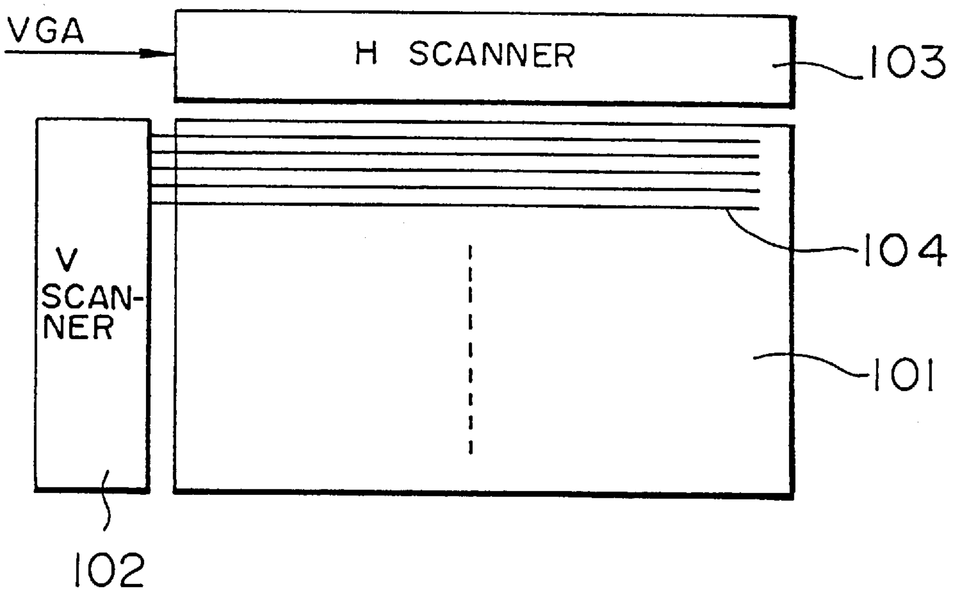
FIG. 16 PRIOR ART
FIG. 16 is a typical plan showing an example of a conventional liquid crystal panel.
Figure 17:
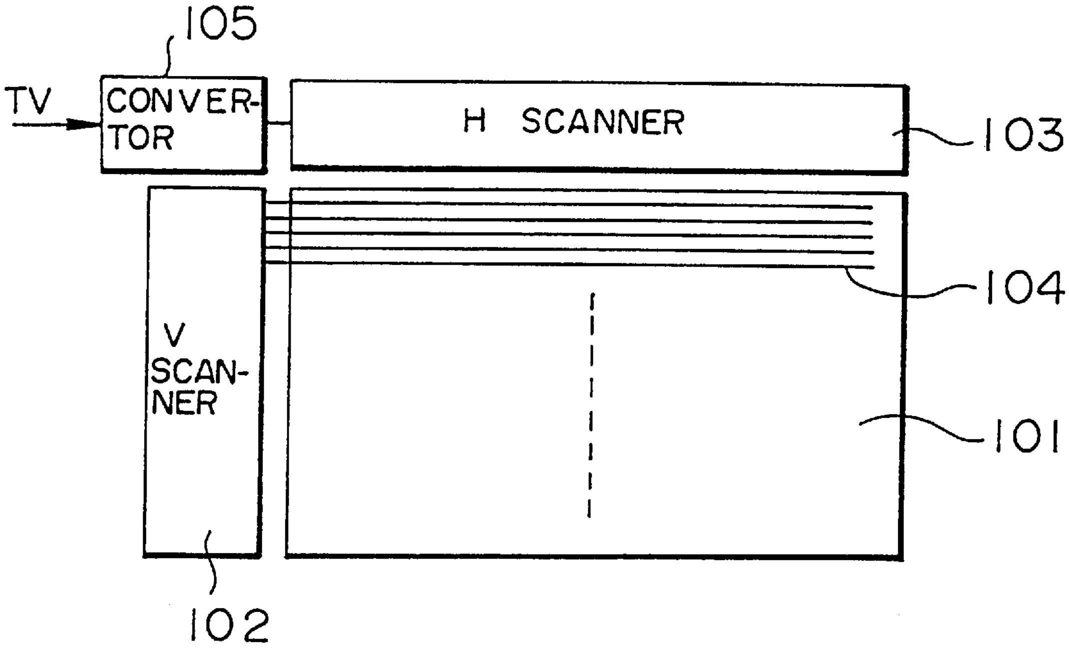
FIG. 17 PRIOR ART
FIG. 17 is a plan showing another example of the conventional liquid crystal panel.
Figure 18:
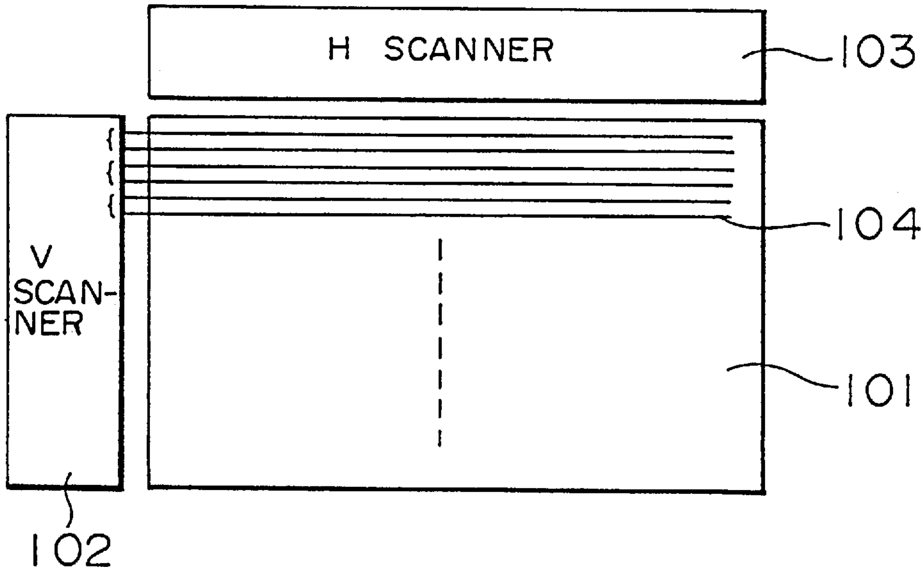
FIG. 18 PRIOR ART
FIG. 18 is a plan showing still another example of the conventional liquid crystal panel.
Figure 19:
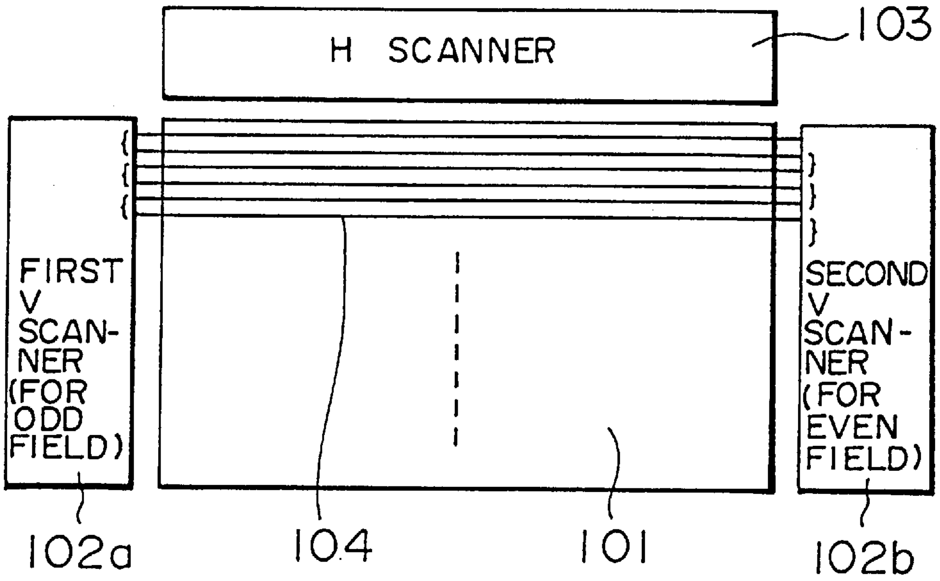
FIG. 19 PRIOR ART
FIG. 19 is a plan showing yet another example of the conventional liquid crystal panel.
Figure 20:
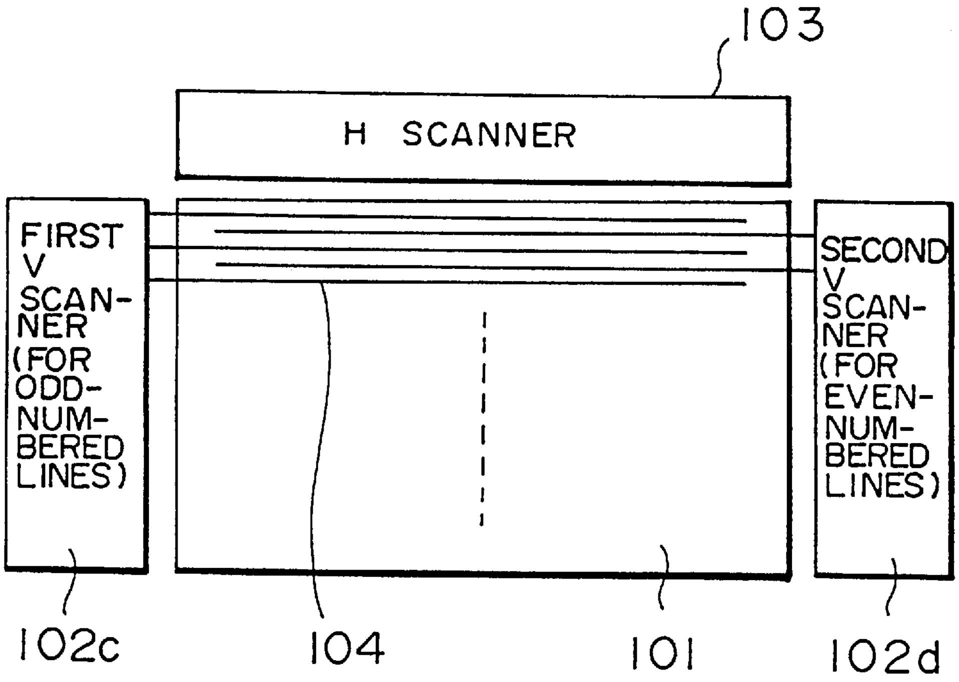
FIG. 20 PRIOR ART
FIG. 20 is a plan showing a further example of the conventional liquid crystal panel.

FIG. 15 is a system block diagram showing the entire configuration of a display apparatus according to the present invention. As shown in the figure, the system comprises a liquid crystal panel 11 having a full-line structure, an RGB driver 12, a decoder 13, and a timing generator 14. The full-line liquid crystal panel 11 has the internal configuration shown in FIG. 1A. It includes arrayed liquid crystal pixels, a vertical-scanning circuit and a horizontal-scanning circuit. The decoder 13 handles an externally input video signal, such as VGA and TV signals, separates horizontal-scanning synchronization signal HSYNC and vertical-scanning synchronization signal VSYC, and then demodulates the video signal to generate image data r, g, and b. The RGB driver 12 performs sample-and-hold according to the sample-and-hole pulses supplied from the timing generator 14 and supplies an alternating-current RGB video signal to the full-line liquid crystal panel 11 according to alternating-current conversion signal FRP. In this example, alternating-current inversion scanning (1H scanning) is performed for each horizontal line according to FRP. The RGB driver 12 also supplies the opposing voltage $V_{com}$ to the full-line liquid crystal panel 11. The timing generator 14 supplies various timing signals required for a noninterlaced drive and an interlaced drive. It supplies to the liquid crystal panel 11 in synchronization with HSYNC and VSYNC, horizontal-scanning start signal HST, horizontal-scanning clock signals HCK1 and HCK2, vertical-scanning start signal VST, vertical-scanning clock signals VCK1 and VCK2, enable signal EN, control signal SLT, etc. It also supplies the sample-and-hole pulses and FRP to the RGB driver 12 as described above.

As described above, according to the present invention, both noninterlaced drive and interlaced drive can be used on one liquid crystal panel by internally switching between one-line separate selection and two-line simultaneous selection. External memory or the like is not required, suppressing the cost of the display apparatus. The present invention also allows the panel to display video signals conforming to various types of standards having the different numbers of scanning lines without mounting a scan converter or the like externally. VGA signals conforming to various standards can be displayed on one liquid crystal panel without changing the aspect ratio.

What is claimed is:

1. A display apparatus comprising arrayed pixels, a vertical-scanning circuit, and a horizontal-scanning circuit, wherein said vertical-scanning circuit sequentially outputs selection pulses and line-sequentially scans pixels in one vertical-scanning period;

said horizontal-scanning circuit transmits and writes a video signal in one horizontal-scanning period into the pixel lines selected with the sequential scanning;

said vertical-scanning circuit includes switching means for controlling the switching of said selection pulses sequentially output and adjusts the number of pixel lines to be selected in a horizontal-scanning period according to the standard of said video signal;

said vertical-scanning circuit further includes a multiple-stage shift register for sequentially transmitting a vertical-scanning start signal according to a vertical-scanning clock signal and for sequentially generating primary selection pulses, and gate means for generating secondary selection pulses by applying gate processing to a pair of primary selection pulses output from adjacent stages in said shift register; and said switching means is disposed between said shift register and said gate means, supplies said pair of primary selection pulses to said gate means so as to output secondary selection pulses when one pixel line is selected in one horizontal-scanning period, and supplies one of said pair of primary selection pulses to said gate means with the other being intercepted to allow the original primary selection pulse to be output when two pixel lines are selected in one horizontal-scanning period.

2. A display apparatus according to claim 1, wherein said switching means enables a noninterlaced drive to be performed for one frame in one vertical-scanning period by selecting one pixel line in every horizontal-scanning period when a video signal conforming to the noninterlace standard is input, and enables an interlaced drive to be performed for one field in one vertical-scanning period by selecting two pixel lines at the same time in every horizontal-scanning period and shifts the simultaneously selected two pixel lines by one line in every field when a video signal conforming to the interlace standard is input.

3. A display apparatus according to claim 1, wherein said switching means enables a normal drive by always selecting one pixel line in every horizontal-scanning period when a video signal conforming to the normal standard having the regular number of scanning lines is input, and enables an extension drive by combining at the specified rate a drive with one pixel line being selected in one horizontal-scanning period and a drive with two pixel lines being selected in one horizontal-scanning period when a video signal conforming to a special standard having a less number of scanning lines than the regular number is input.

4. A display apparatus according to claim 1, wherein said vertical-scanning circuit enables a noninterlaced drive to be performed for one frame in one vertical-scanning period by selecting one pixel line in one horizontal-scanning period when a video signal conforming to the noninterlace standard is input, enables an interlaced drive to be performed for one field in one vertical-scanning period by selecting one of two pixel lines and not selecting the other in every horizontal-scanning period when a video signal conforming to the interlace standard is input, and includes means for switching pixel lines to be selected and pixel lines to be not selected in every field.

5. A display apparatus comprising arrayed pixels, a vertical-scanning circuit, and a horizontal-scanning circuit, wherein said vertical-scanning circuit sequentially outputs selection pulses and line-sequentially scans pixels in one vertical-scanning period;

said horizontal-scanning circuit transmits and writes a video signal in one horizontal-scanning period into the pixel lines selected with the sequential scanning; and said vertical-scanning circuit comprises:

(i) a multiple-stage shift register for sequentially transmitting a vertical-scanning start signal according to a vertical-scanning clock signal and for sequentially generating primary selection pulses, (ii) gate means for generating secondary selection pulses by applying gate processing to a pair of primary selection pulses output from adjacent stages in said shift register, and (iii) switching means, disposed between said shift register and said gate means, for controlling the switching of said selection pulses sequentially output and adjusts the number of pixel lines to be selected in a horizontal-scanning period according to the standard of said video signal.

6. A display apparatus according to claim 5, wherein said switching means supplies said pair of primary selection pulses to said gate means so as to output secondary selection pulses when one pixel line is selected in one horizontal-scanning period.

7. A display apparatus according to claim 6, wherein said switching means further supplies one of said pair of primary selection pulses to said gate means with the other being intercepted to allow the original primary selection pulse to be output when two pixel lines are selected in one horizontal-scanning period.

8. A display apparatus according to claim 5, wherein said switching means enables a noninterlaced drive to be performed for one frame in one vertical-scanning period by selecting one pixel line in every horizontal-scanning period when a video signal conforming to the noninterlace standard is input, and enables an interlaced drive to be performed for one field in one vertical-scanning period by selecting two pixel lines at the same time in every horizontal-scanning period and shifts the simultaneously selected two pixel lines by one line in every field when a video signal conforming to the interlace standard is input.

9. A display apparatus according to claim 5, wherein said switching means enables a normal drive by always selecting one pixel line in every horizontal-scanning period when a video signal conforming to the normal standard having the regular number of scanning lines is input, and enables an extension drive by combining at a specified rate a drive with one pixel line being selected in one horizontal-scanning period and a drive with two pixel lines being selected in one horizontal-scanning period when a video signal conforming to a special standard having a less number of scanning lines than the regular number is input.

10. A display apparatus according to claim 5, wherein said vertical-scanning circuit enables a noninterlaced drive to be performed for one frame in one vertical-scanning period by selecting one pixel line in one horizontal-scanning period when a video signal conforming to the noninterlaced standard is input, enables an interlaced drive to be performed for one field in one vertical-scanning period by selecting one of two pixel lines and not selecting the other in every horizontal-scanning period when a video signal conforming to the interlace standard is input, and includes means for switching pixel lines to be selected and pixel lines to be not selected in every field.

* * * * *